United States Patent
Aronson et al.

(10) Patent No.: US 7,177,157 B2
(45) Date of Patent: Feb. 13, 2007

(54) MULTIPLE WIDTH TRANSCEIVER HOST BOARD SYSTEM

(75) Inventors: Lewis B. Aronson, Los Altos, CA (US); Paul K. Rosenberg, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 581 days.

(21) Appl. No.: 10/036,995

(22) Filed: Oct. 22, 2001

(65) Prior Publication Data
US 2003/0076658 A1    Apr. 24, 2003

(51) Int. Cl.
*H05K 7/16* (2006.01)

(52) U.S. Cl. .................. 361/727; 361/686; 361/756; 385/14; 385/15; 439/377

(58) Field of Classification Search ............... 361/741, 361/756, 727, 686, 802; 439/377, 540.1; 385/135, 14–15
See application file for complete search history.

(56) References Cited

U.S. PATENT DOCUMENTS

| | | | | |
|---|---|---|---|---|
| 5,642,264 A | * | 6/1997 | Cantrell | 361/802 |
| 5,761,033 A | | 6/1998 | Wilhelm | |
| 6,008,995 A | * | 12/1999 | Pusateri et al. | 361/796 |
| 6,038,126 A | * | 3/2000 | Weng | 361/679 |
| 6,047,172 A | * | 4/2000 | Babineau et al. | 455/300 |
| 6,166,917 A | * | 12/2000 | Anderson | 361/756 |
| 6,198,633 B1 | | 3/2001 | Lehman et al. | 361/756 |
| 6,297,949 B1 | * | 10/2001 | Nayak et al. | 361/684 |
| 6,304,436 B1 | * | 10/2001 | Branch et al. | 361/683 |
| 6,335,869 B1 | | 1/2002 | Branch et al. | 361/816 |

* cited by examiner

*Primary Examiner*—Elvin Enad
*Assistant Examiner*—Hung S. Bui
(74) *Attorney, Agent, or Firm*—Workman Nydegger

(57) ABSTRACT

The present invention provides a host board system in which transceivers of two sizes (the larger approximately twice the width of the smaller) can be arbitrarily mixed within a given host board design. This is accomplished by specifying an arrangement of electrical connectors, a guide rail design, a set of transceiver features, and a bezel configuration to meet this need as well as the other requirements of optoelectronic transceivers. Typically, two slots and connectors are lined up behind an opening in a bezel that provides transceiver access to two connectors. So that either double-width or single-width transceivers can be used in the same opening, the double-width transceiver is designed to engage with the connectors in the same position as a single-width transceiver. Further, the slots and connectors are spaced evenly so that all of the slots and connectors can accommodate a single-width transceiver and all adjacent slots and connectors can accommodate a double-width transceiver.

42 Claims, 13 Drawing Sheets

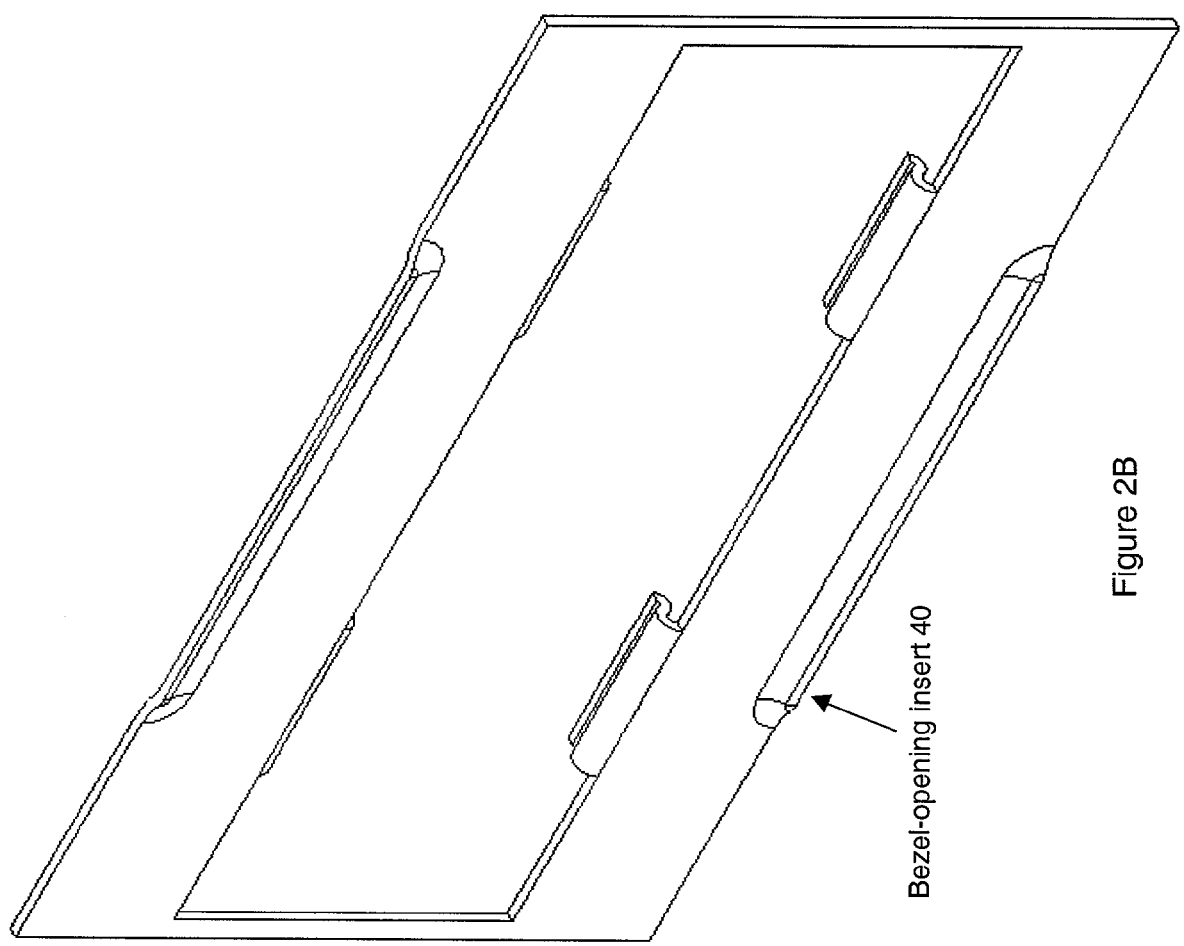

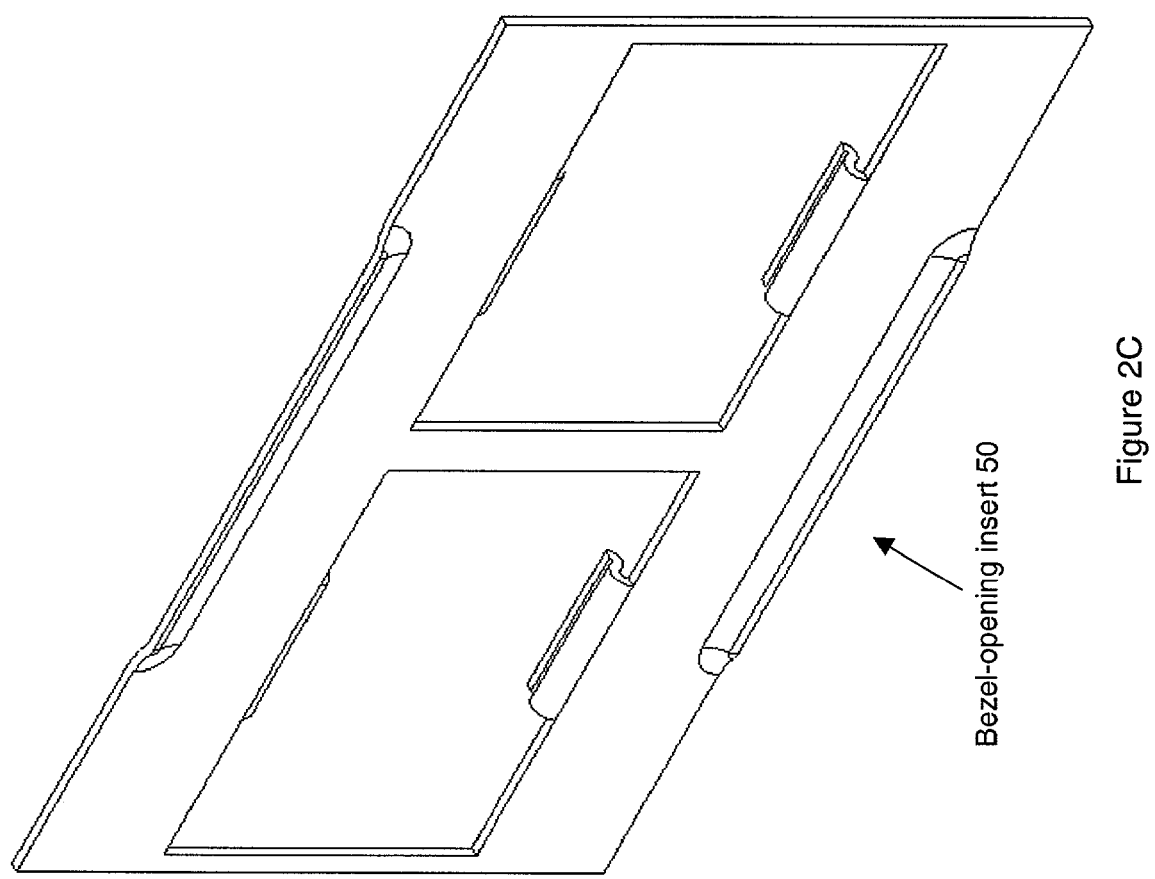

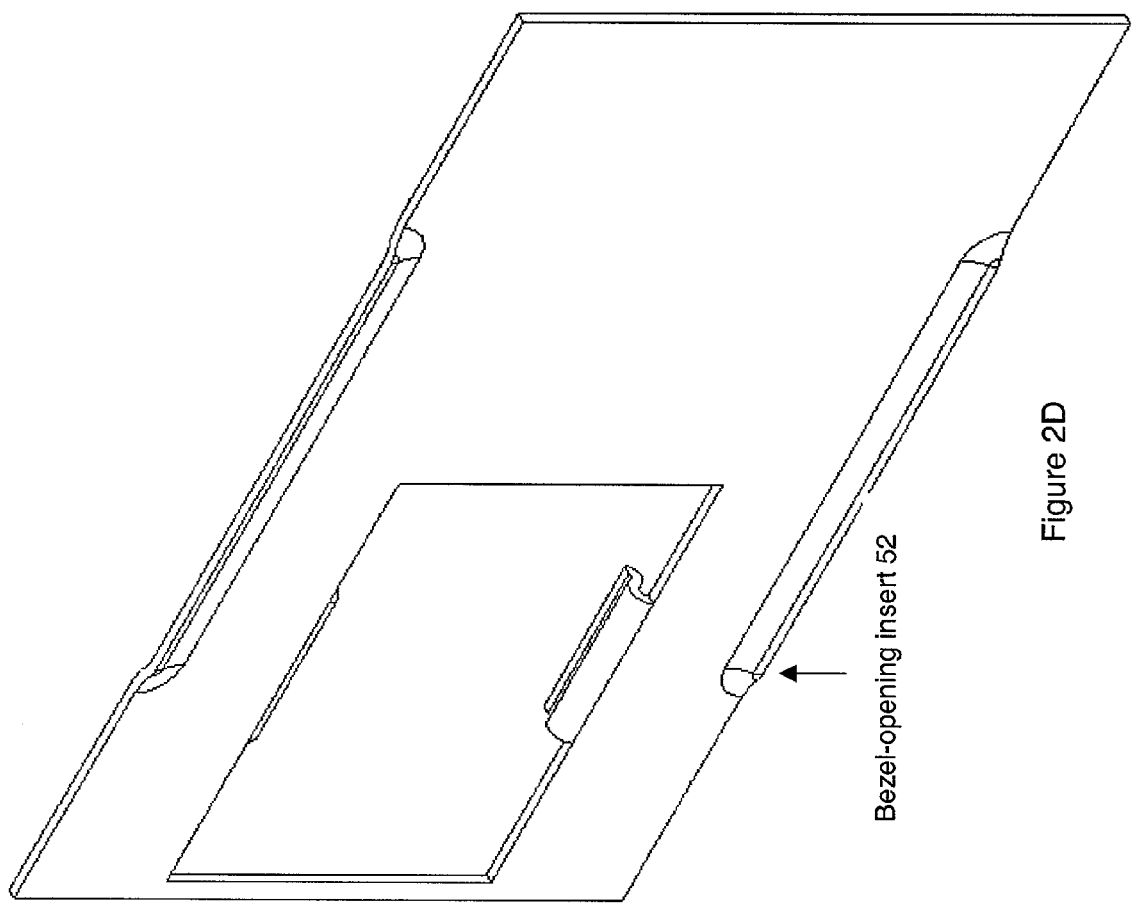

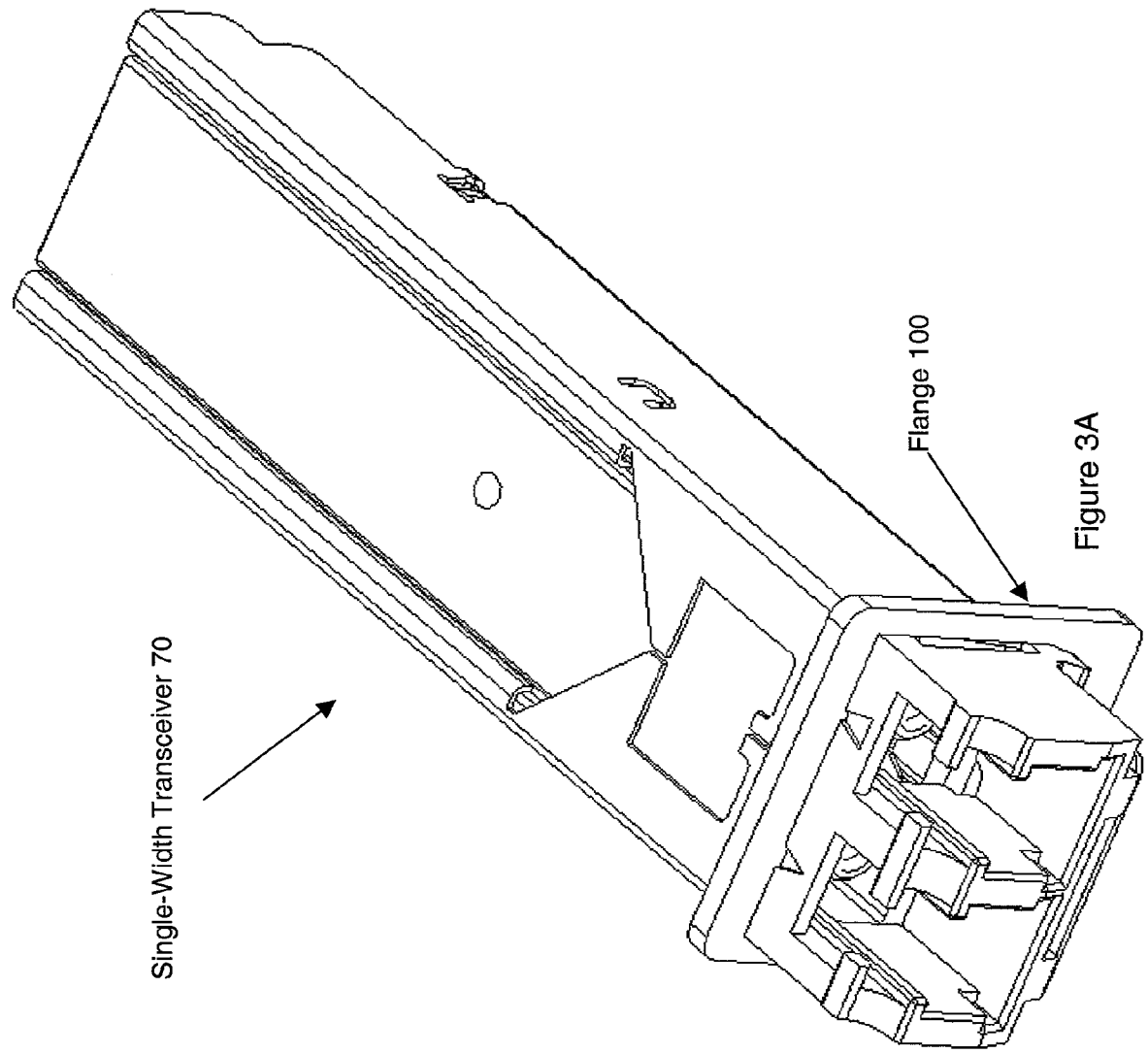

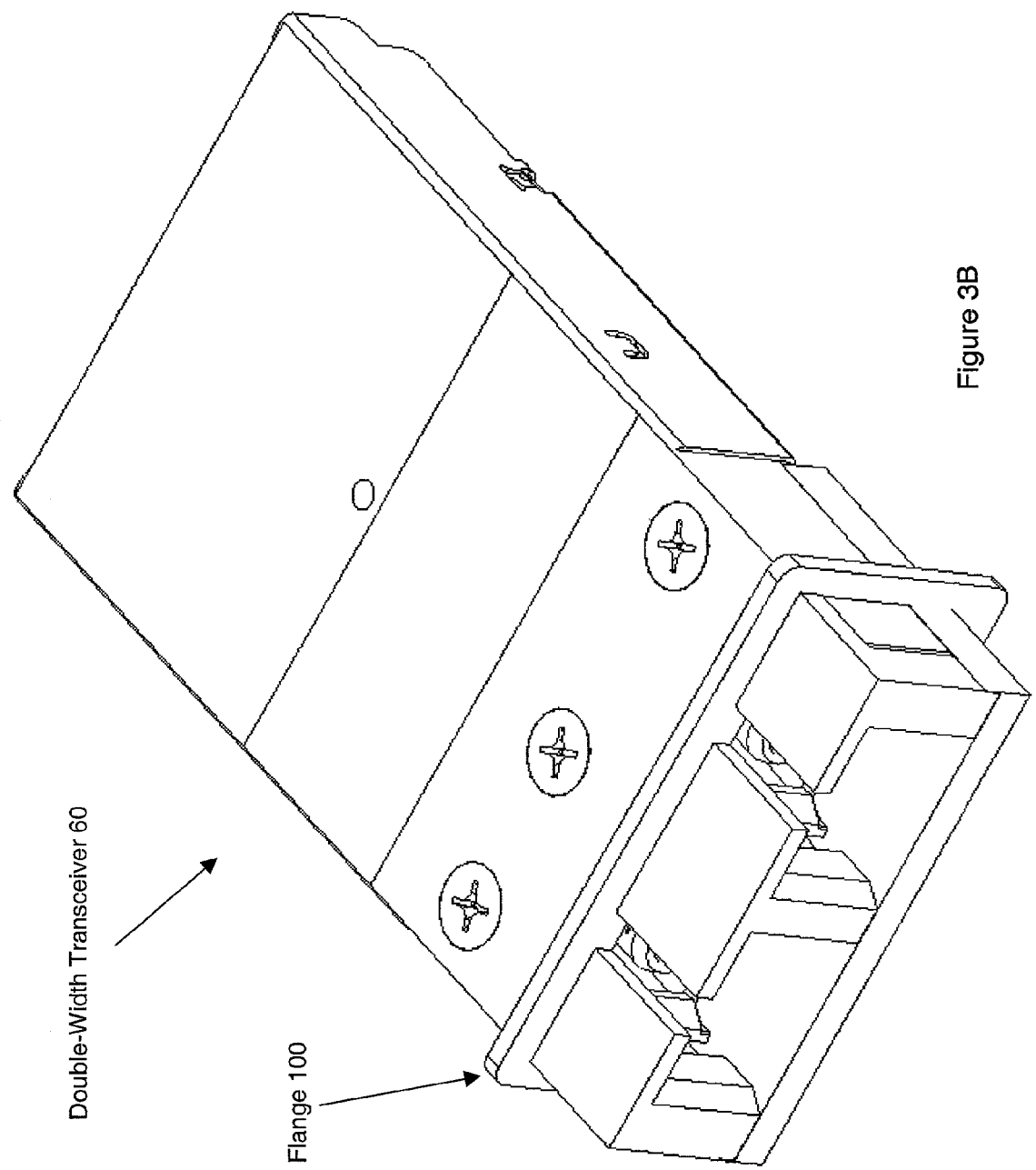

Detail 112

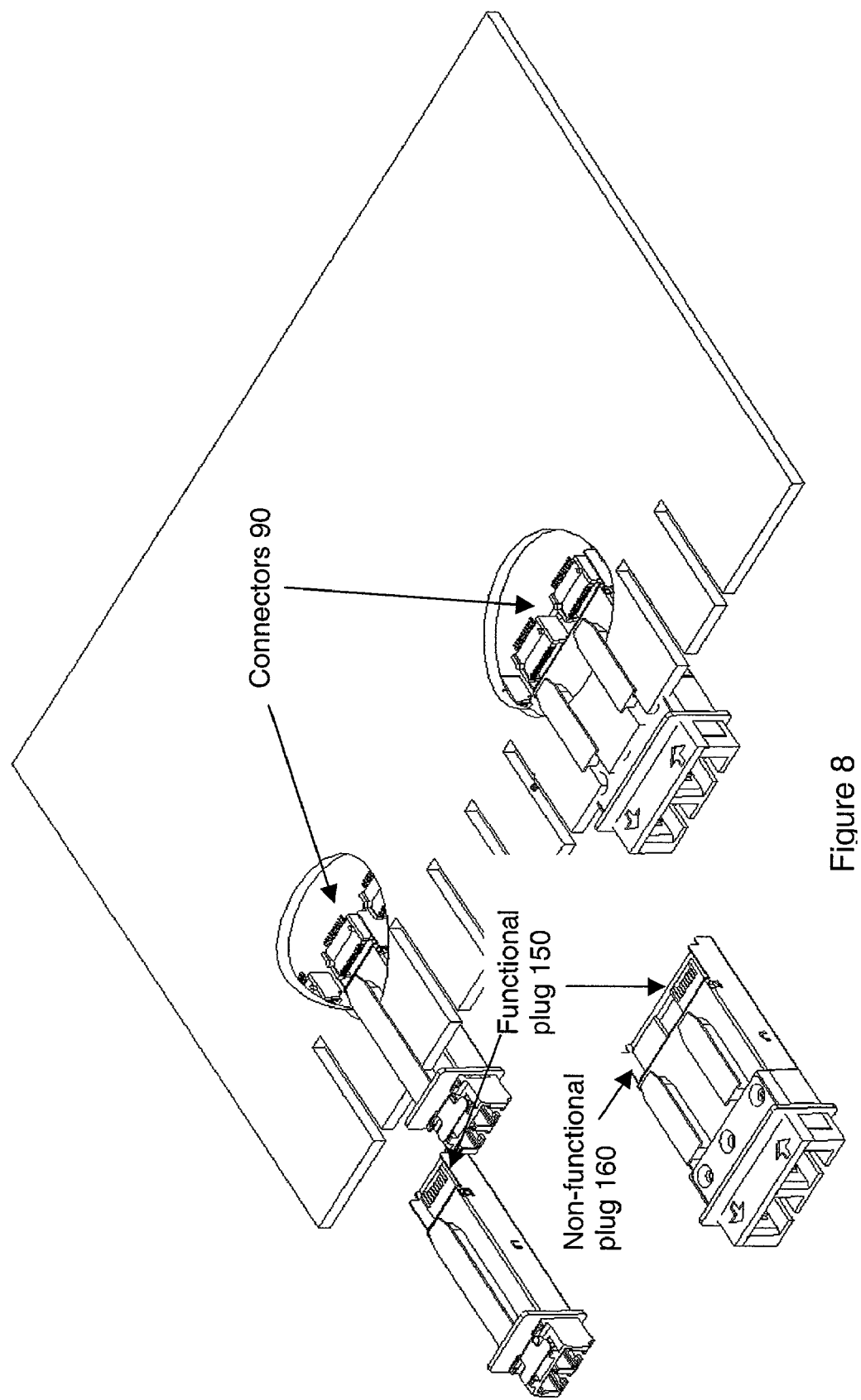

MULTIPLE WIDTH TRANSCEIVER HOST BOARD SYSTEM

The present invention relates generally to host board systems, and particularly to a host board system configured to receive transceivers of multiple widths.

BACKGROUND OF THE INVENTION

An optical transceiver is a physical device that connects a host interface (i.e., host board) to a fiber optic network or other communication system. In the present invention, the transceivers are optoelectronic transceivers, which means that data is transmitted to and from the transceivers electrically at one end, and optically at the other end. In systems that use optoelectronic transceivers, it is often desirable to pack as many transceivers as possible on the edge (i.e., back face) of a host board to maximize the communication bandwidth of the systems. Very narrow transceivers that can be packed at a dense pitch are, therefore, desirable. As a result, host boards are often configured to accommodate a series of small form factor (i.e., narrow or single-width) transceivers.

Such host boards are only viable, however, if each transceiver connected thereto has a common form factor (i.e., similar width). But there exist a variety of transceiver designs to address different needs. For example, vertical-cavity surface emitting lasers (VCSELs) are often used for very short optical links (i.e., the distance light must travel from a light source to a receiver) of up 500 meters. Simple Fabry-Perot 1310 nm lasers are often used for optical link lengths of up to 20 km in systems designed for 1 Gigabit per second data rates or 2 km in systems designed for 10 Gigabit per second data rates. But for much longer optical links with lengths of up to 80 km at 1 Gb per second data rates and up to 10 to 40 km at 10 Gb per second data rates and where it is desired to combine signals of different wavelengths, transceivers integrating DFB lasers with temperature controllers and avalanche photo diodes (APDs) are often required.

The VCSEL and Fabry-Perot laser based transceivers can often be constructed in very narrow widths (i.e., small form factor designs or single-width transceivers), but more complex designs, such as transceivers integrating DFB lasers with temperature controllers and avalanche photo diodes, often require a greater widths (i.e., larger form factor designs) to accommodate the extra circuitry and thermal dissipation considerations.

These larger form factor transceivers cannot be used on the above described host boards because each slot available to a transceiver is designed to fit only single-width transceivers. To address this problem, some host boards have been designed to accommodate a fixed number of small form factor transceivers and another fixed number of larger form factor transceivers. This solution is inefficient and inflexible. Host boards designed to accommodate a fixed number of small form factor transceivers and another fixed number of larger form factor transceivers limit users to a certain number of small form factor and another certain number of larger form factor transceivers even though needs can and do change.

SUMMARY OF THE INVENTION

The present invention is a host board system comprising a host board at least partially positioned within a housing having a set of openings. The host board includes a set of connectors. Each opening in the set of openings is aligned with at least two connectors so that a transceiver inserted through the openings can electrically engage with one or more of the two connectors. Each opening in the set of openings is configured to accept two single-width transceivers or one double-width transceiver. The double-width transceiver may or may not engage with both connectors.

In another aspect of the invention, the host board system includes a set of slots. The connectors are mounted on the host board and the slots are routed into the host board. Each slot is configures so that a transceiver can slidingly engage the slot. Further, the set of connectors is positioned with respect to the set of slots such that a single-width transceiver can slidingly engage a connector from any of the slots. Finally, the set of connectors is also positioned with respect to the set of slots so that double-width transceivers slidingly engage adjacent slots and electrically couple with a corresponding connector from the set of connectors. Transceivers of triple width or larger could also be accommodated.

BRIEF DESCRIPTION OF THE DRAWINGS

Additional objects and features of the invention will be more readily apparent from the following detailed description and appended claims when taken in conjunction with the drawings, in which:

FIG. 2B is a diagram of a bezel-opening insert consistent with a preferred embodiment of the present invention.

FIG. 2C is a diagram of a bezel-opening insert consistent with a preferred embodiment of the present invention.

FIG. 2D is a diagram of a bezel-opening insert consistent with a preferred embodiment of the present invention.

FIG. 3A is a diagram of a flange included on transceivers in a manner consistent with a preferred embodiment of the present invention.

FIG. 3B is a diagram of a flange included on transceivers in a manner consistent with a preferred embodiment of the present invention.

FIG. 8 is a diagram of a host board system, with emphasis on functional and non-functional plugs included in the host board system, consistent with a preferred embodiment of the present invention.

DESCRIPTION OF THE PREFERRED EMBODIMENTS

Figure 1:
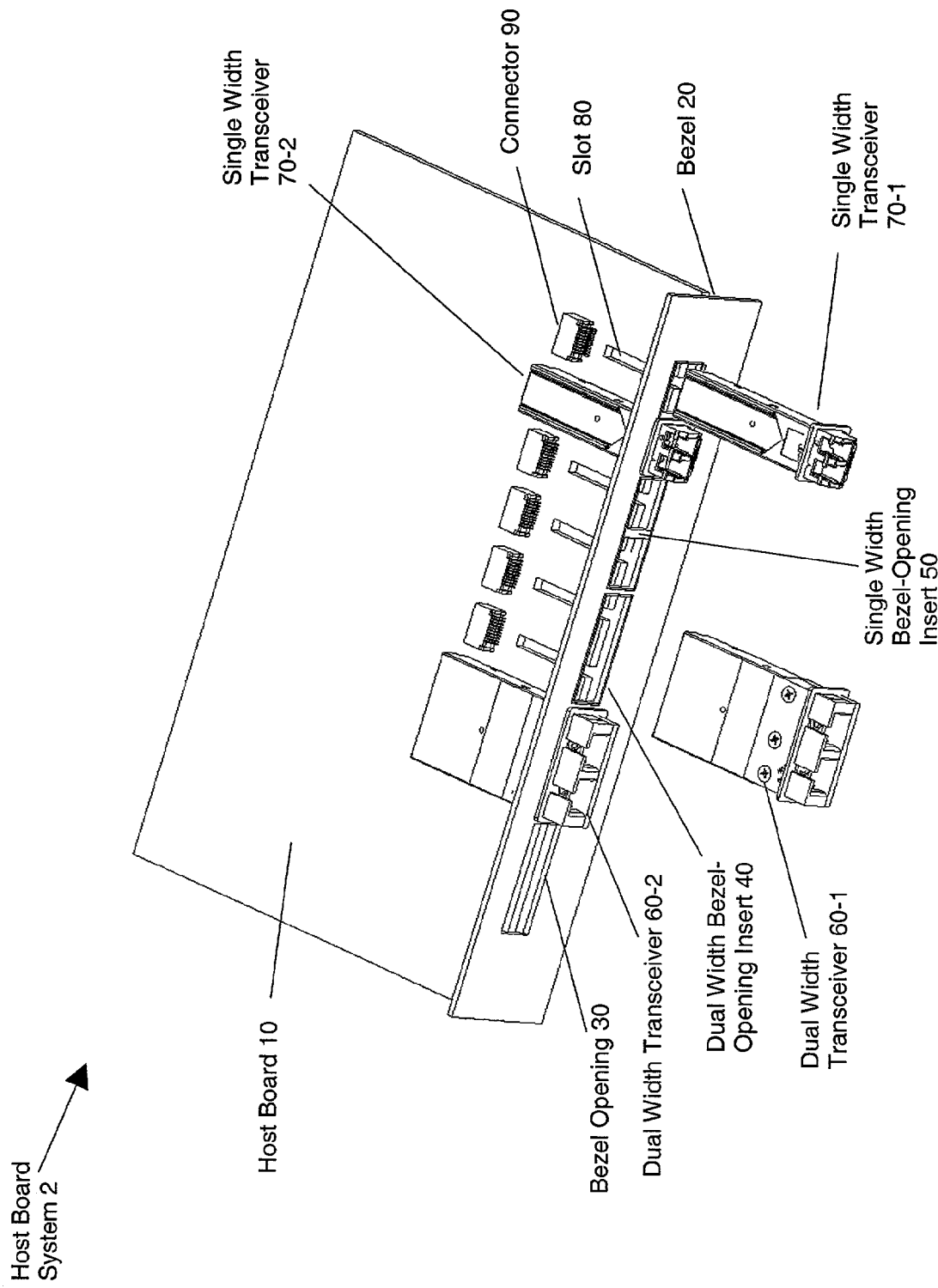
FIG. 1 is a diagram of a host board system of a preferred embodiment of the present invention from a top, perspective view.

FIG. 1 illustrates a host board system 2 consistent with a preferred embodiment of the present invention. Included in FIG. 1 are a host board 10, a bezel 20, a series of bezel openings 30, bezel-opening inserts 40 and 50, double-width transceivers 60, single-width transceivers 70, a series of slots 80, and a series of connectors 90.

The host board 10 is preferably rectangular in shape and includes a variety of electronic components necessary to process signals originating from one or more transceivers 60, 70 electrically engaged with the host board 10. Aside from the circuitry specifically discussed herein, the contents of the host board are otherwise standard, and not critical to the present invention.

Attached to the back edge of the host board 10 is a bezel 20. The bezel 20 serves to contain electromagnetic emissions ("EMI") produced by the signals originating from the one or more transceivers 60, 70 electrically engaged with the host board 10 or from other circuitry within the enclosure. The bezel 20 also serves to support and guide one or more transceivers 60, 70 engaged with the host board 10. When the host board 10 is fully inserted in a larger signal processing system, the bezel 20 and the larger signal processing system contain EMI emissions in all directions. It is, therefore, the shape of the larger signal processing system that dictates the size and shape of the bezel 20. But the size and shape of the bezel 20 are not critical to the present invention.

The bezel 20 includes bezel openings 30, which are distributed in series across the bezel 20. The bezel openings 30 are large enough to accommodate transceivers of a variety of sizes. In the preferred embodiment, however, the largest transceiver is a double-width transceiver 60, so the bezel openings 30 are "double-width bezel openings." The specific size of the bezel openings 30 is not critical to the present invention. What is important is the positioning of the bezel openings with respect to the slots 80 and connectors 90. Specifically, a double-width transceiver 60 or one or two single-width transceivers 70 must be able to electrically engage a corresponding connector 90 when inserted into any of the bezel openings 30. This aspect of the present invention allows users of the invention to use varying combinations of single-width transceivers 70 and double-width transceivers 60 with the same host board system 2, without having to modify the host board system 2. Thus, the host board system 2 may accommodate a set of densely packed single-width transceivers 70 (i.e., two inserted into each opening 30) or half as many double-width transceivers 60 (i.e., one double-width transceiver 60 per opening 30) or any other combination. Further, not every opening 30 need be used or completely filled with transceivers. Unused openings may be closed with an EMI blocking insert, and partially used openings (e.g., occupied by only one single-width transceiver 70) may have their unused portion covered by a smaller EMI blocking insert.

As illustrated in FIG. 1, the bezel openings 30 are evenly spaced. This spacing reflects the spacing of corresponding slots 80 and connectors 90. More specifically, the amount of space between each of the slots 80 and connectors 90 is the same. In alternate embodiments, the slots 80 and connectors 90 are grouped such that a greater amount of space separates the groups of slots 80 and connectors 90 than the slots 80 and connectors 90 of each group. The key is that the slots 80 and connectors 90 corresponding to a given bezel opening 30 are spaced so that a group of slots 80 and connectors 90 can accommodate either one double-width transceiver 60, two single-width transceivers 70, or one single-width transceiver 70.

Figure 2A:
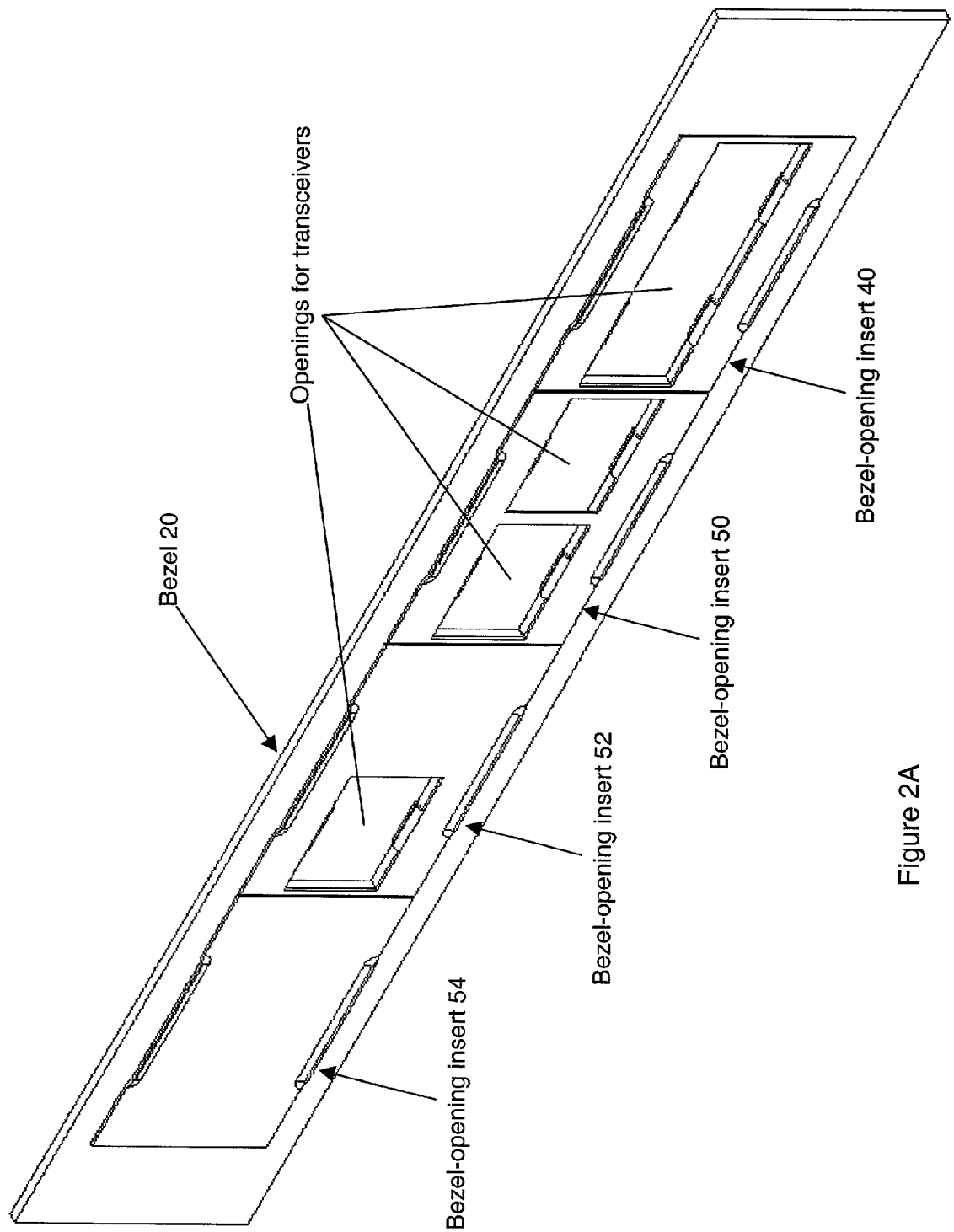
FIG. 2A is a diagram of a bezel and bezel-opening inserts consistent with a preferred embodiment of the present invention.

Before one or more transceivers 60, 70 are inserted into the bezel openings 30, bezel-opening inserts are preferably "snapped" into the bezel openings 30. Preferred embodiments of the present invention include four types of bezel opening inserts. FIG. 2A illustrates a first type of bezel-opening insert 40, a second type of bezel-opening insert 50, a third type of bezel-opening insert 52, and a fourth type of bezel-opening insert 54 inserted into four bezel openings 30 of a bezel 20. In the preferred embodiments, each of the bezel-opening inserts is made of metal, or metal impregnated or metal coated plastic, so as to block electromagnetic radiation originating from inside the system 2. Thus, the bezel-opening inserts act as EMI shields.

The first type of bezel-opening insert 40, which is separately illustrated in FIG. 2B, is designed to accommodate one double-width transceiver 60. This first type of bezel-opening insert 40 serves to reduce the size of the bezel opening 30 so that a double-width transceiver forms a seal with the bezel-opening insert 40 when inserted through a bezel opening 30 and electrically engaged with a connector 90. Like the other types of bezel-opening inserts, this first type of bezel-opening insert 40 snaps into place, forming a seal with the bezel 20.

The second type of bezel-opening insert 50, which is separately illustrated in FIG. 2C, is designed to simultaneously accommodate two single-width transceivers 70. That is, the second type of bezel-opening insert 50 permits two single-width transceivers 70 to engage a slot 80 and connector 90. This type of bezel-opening insert 50 accommodates two side-by-side single-width transceivers 70. The openings in this insert 50 are essentially sized and positioned the same as the opening in the first type of bezel-opening insert 40, except that a divider is included to separate the two single-width transceivers 70. This second type of bezel opening 50 serves to reduce the size of the bezel opening 30 to two smaller openings so that each single-width transceiver 70 forms a seal with the bezel-opening insert 50 when inserted through a bezel opening 30 and electrically engaged with a connector 90.

The third type of bezel-opening insert 52, which is separately illustrated in FIG. 2D, is designed to accommodate one single-width transceiver 70. Importantly, the opening in this third type of bezel opening 52 insert is not centered. Rather, the opening is offset so that it is in the same position as one of the openings in the second type of bezel-opening insert 50.

This means that single-width transceivers 70 consistent with a preferred embodiment of the present invention may be used with either type of bezel-opening insert 50, 52. This third type of bezel opening 52 serves to reduce the size of the bezel opening 30 to one smaller opening so that a single-width transceiver 70 forms a seal with the bezel-opening insert 52 when inserted through a bezel opening 30 and electrically engaged with a connector 90.

Figure 2E:
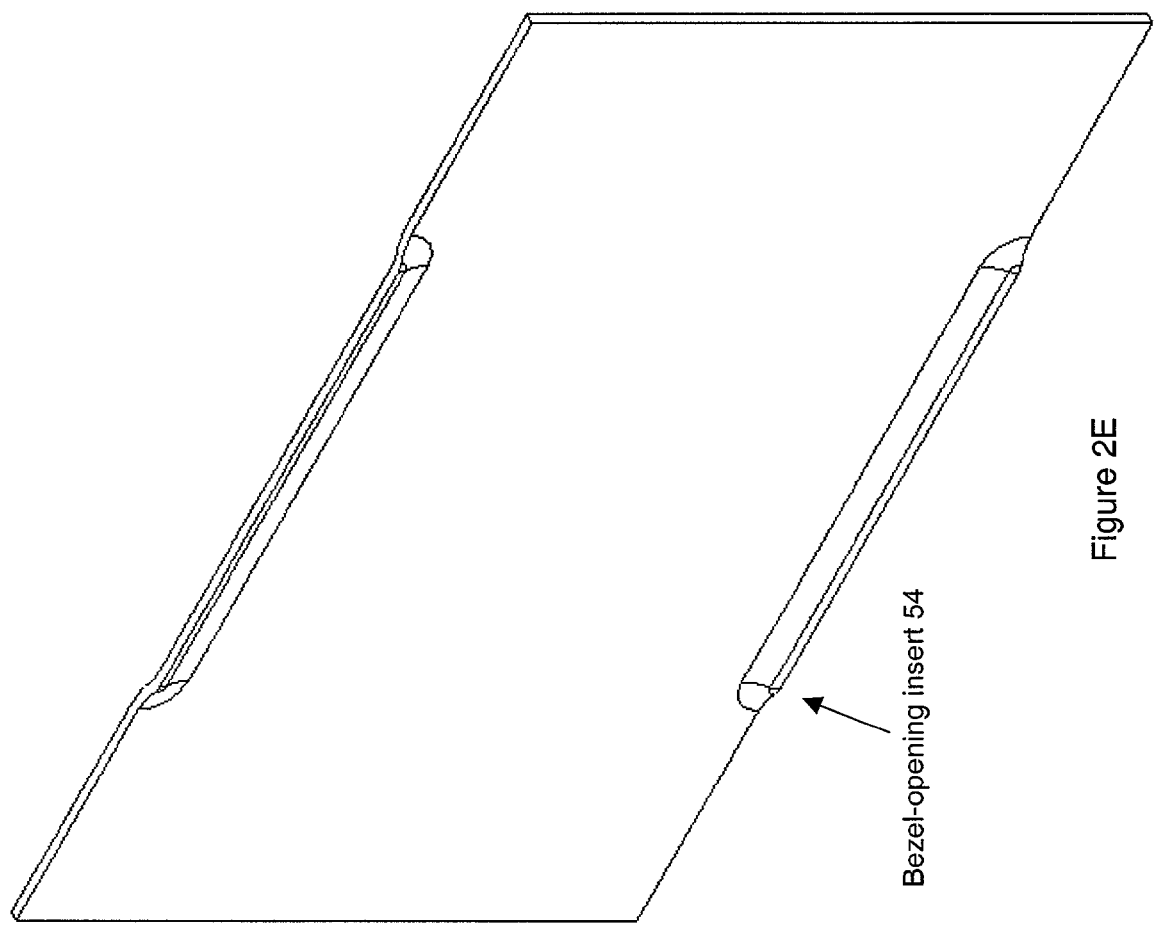
FIG. 2E is a diagram of a bezel-opening insert consistent with a preferred embodiment of the present invention.

Finally, the fourth type of bezel-opening insert 54, which is separately illustrated in FIG. 2E, is not designed to accommodate any transceivers. The purpose of the fourth type of bezel-opening insert 54 is to seal an unused bezel opening 30 (i.e., a bezel opening 30 without a transceiver).

To facilitate the formation of a seal between a bezel-opening insert and a transceiver, a flange 100 is included on both the single-width transceivers 70 and the double-width transceivers 60. Though included in all illustrations of the transceivers, FIGS. 3A and 3B point out the flange 100 with particularity. The flange 100 preferably extends around the entire perimeter of the transceivers. And as illustrated in FIGS. 3A and 3B, the flange 100 is oriented so that when a transceiver is inserted into a bezel opening 30, the entire flange 100 is flush against a bezel-opening insert.

The flange 100 is preferably made of metal, or metal impregnated or metal coated plastic, so as to block electromagnetic radiation originating from inside the system 2. In addition, the bezel 20 of the system 2 is also made of metal is preferably grounded to the overall chassis ground of the system which is in turn connected to the circuit ground at a single location. The flange 100 of each transceiver 60, 70 forms an electrical connection with the bezel 20 so as to ground the outside housing of the transceiver 60, 70. Grounding the transceiver's housing at the opposite end from the connectors 90 helps to prevent the transceiver from transmitting electromagnetic radiation into the environment surrounding the system 2. More generally, the bezel 20, transceiver flanges 100 and bezel-opening inserts work together to prevent the transmission or leakage of electromagnetic radiation into the environment surrounding the system 2.

Distributed across the edge of the host board 10 closest to the bezel 20 is a series of slots 80.

The slots 80 are designed to guide a transceiver to a corresponding connector 90 and secure the transceiver in place once the transceiver is electrically engaged with a corresponding connector 90. As indicated above, the slots 80 are preferably spaced evenly so that all of the slots 80 can simultaneously accommodate single-width transceivers 70, and so that adjacent pairs of slots 80 can each accommodate a double-width transceiver 60. Additionally, in the preferred embodiment, the slots are routed into the host board 10. This is preferred because the amount of space required by the host board system 2 is reduced. More specifically, the portion of the transceivers that secure the transceivers to the host board 10 fits into the slots 80, and therefore, uses space that would otherwise be inactive. As illustrated in FIG. 1, the difference in thickness between the host board 10 and the transceivers is not so great as to render this space-savings meaningless. Nevertheless, alternate embodiments do not route slots 80 into the host board 10. Instead, these alternate embodiments mount a raised slot 80 onto the host board 10. These raised slots 80 function in much the same way as the slots 80 illustrated in the various figures included herein.

Figure 4:
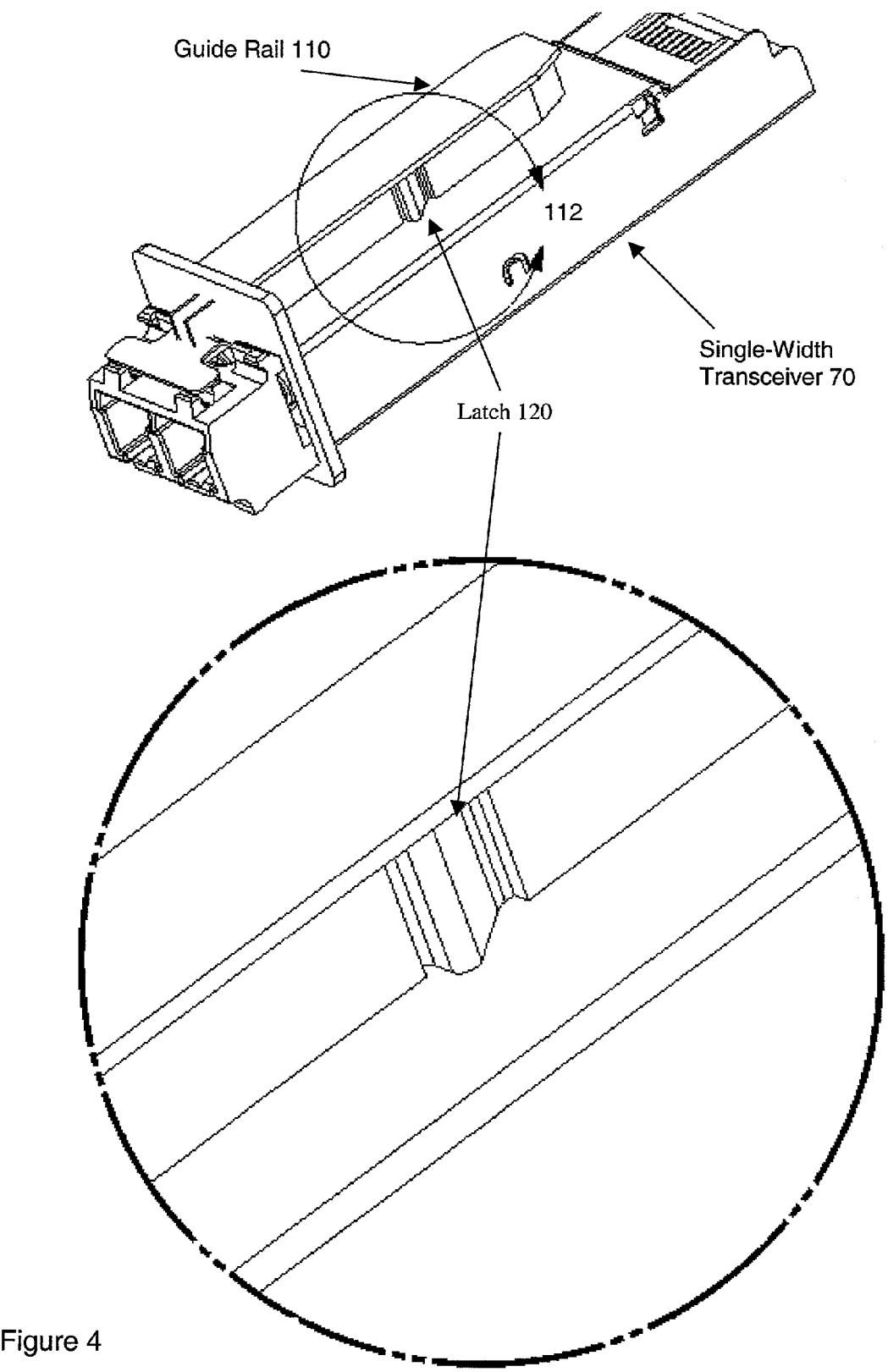
FIG. 4 is a diagram of a guide rail and latch included on a transceiver in a manner consistent with a preferred embodiment of the present invention.

In the preferred embodiment, as illustrated in FIG. 4, the transceivers 60, 70 include one or more guide rails 110 that slidingly engage the slots 80. The view of the single-width transceiver 70 in FIG. 4 is a bottom perspective of the single-width transceiver 70, so the guide rails 110 are preferably located on a bottom surface of the transceivers and abut the flange 100. The precise shape of the guide rail 110 is not critical so long as the guide rail 100 fits securely in each of the slots 80.

Figure 5:
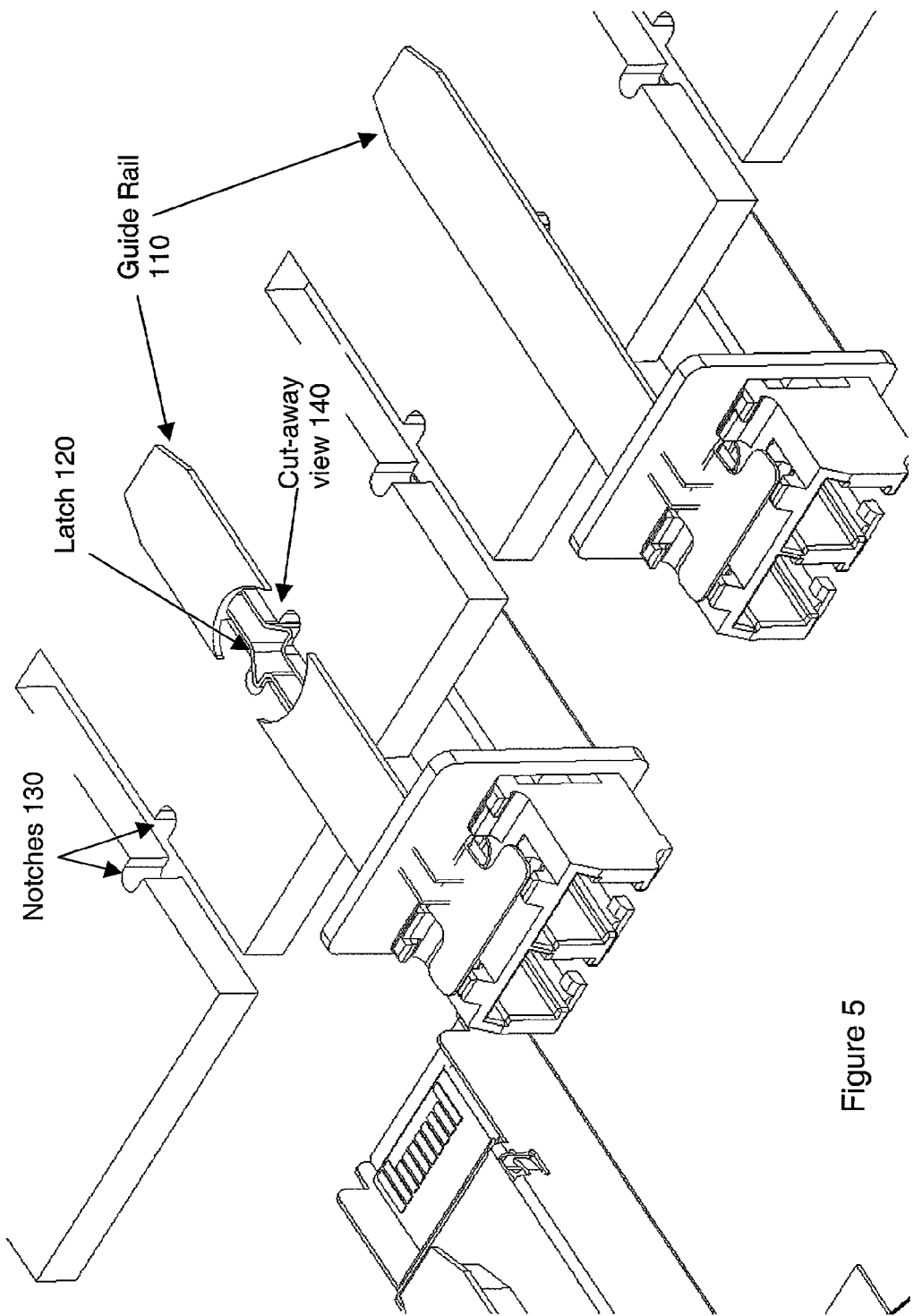
FIG. 5 is a diagram of a number of notches, latches, and guide rails consistent with a preferred embodiment of the present invention.
Figure 6:
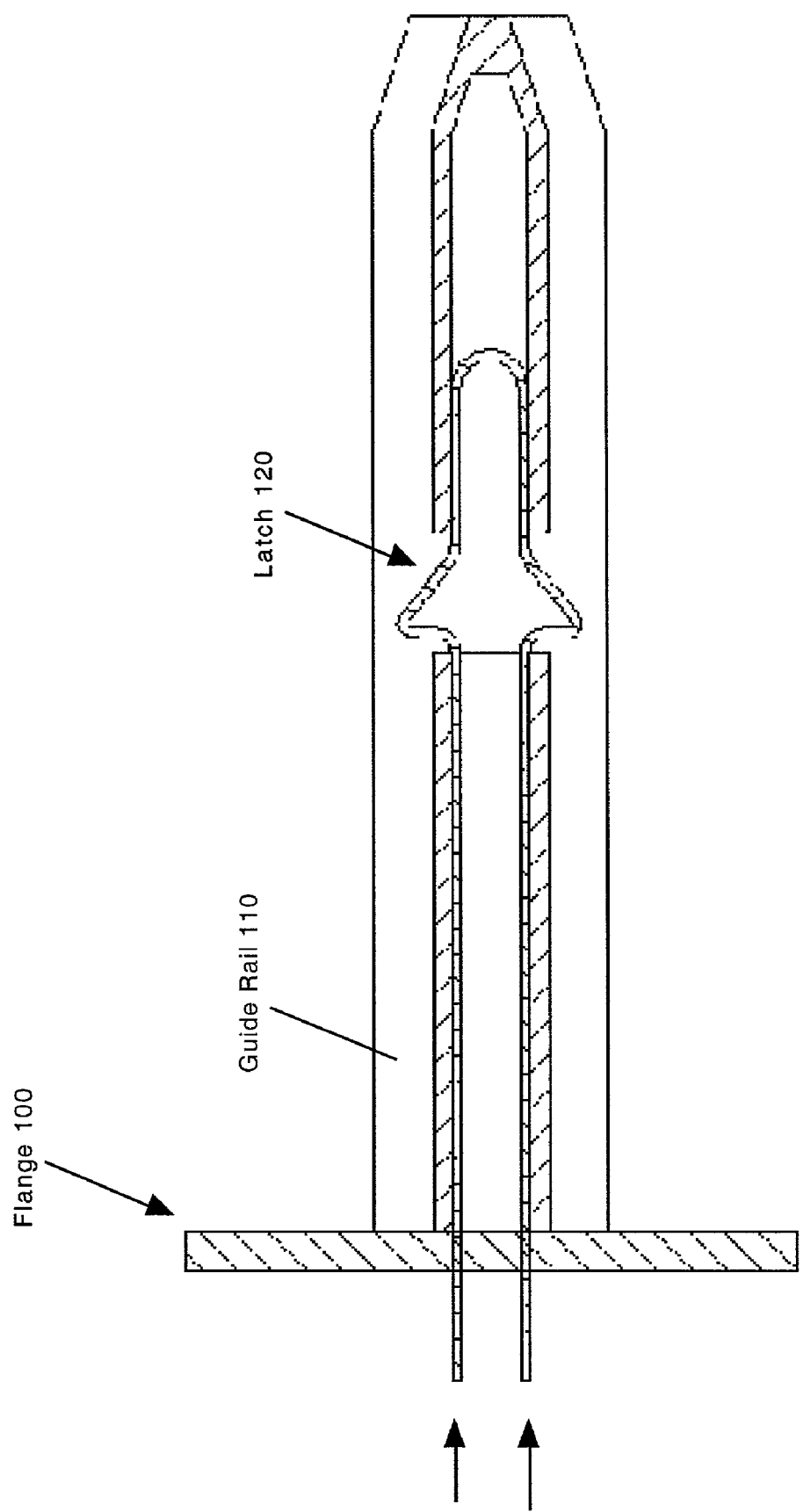
FIG. 6 is a diagram of a flange, guide rail, and latch included on transceiver in a manner consistent with a preferred embodiment of the present invention.

Included with the guide rails 110 is a latch 120, which is designed to secure the guide rails 110 (and thus the transceiver) within a slot 80 once the guide rail 110 is fully inserted into the slot 80. FIG. 4, and the detail 112 included with FIG. 4 in particular, illustrate part of the latch 120 that is viewable from the exterior of the guide rail 110. The latch 120 is also illustrated by FIG. 5 in the cut-away view 140, which shows the latch 120 extending through a corresponding guide rail 110 and into two notches 130 on both sides of the slot 80. As illustrated in the cut-away view 140, the latch 120 secures the transceiver in place. To remove a transceiver, the latch 120 is slid forward which causes it to retract within the guide rail 110 and out of the notches 130. Once the latch 120 is drawn inside the guide rail 110, the transceiver is removable with minimal effort.

Figure 7:
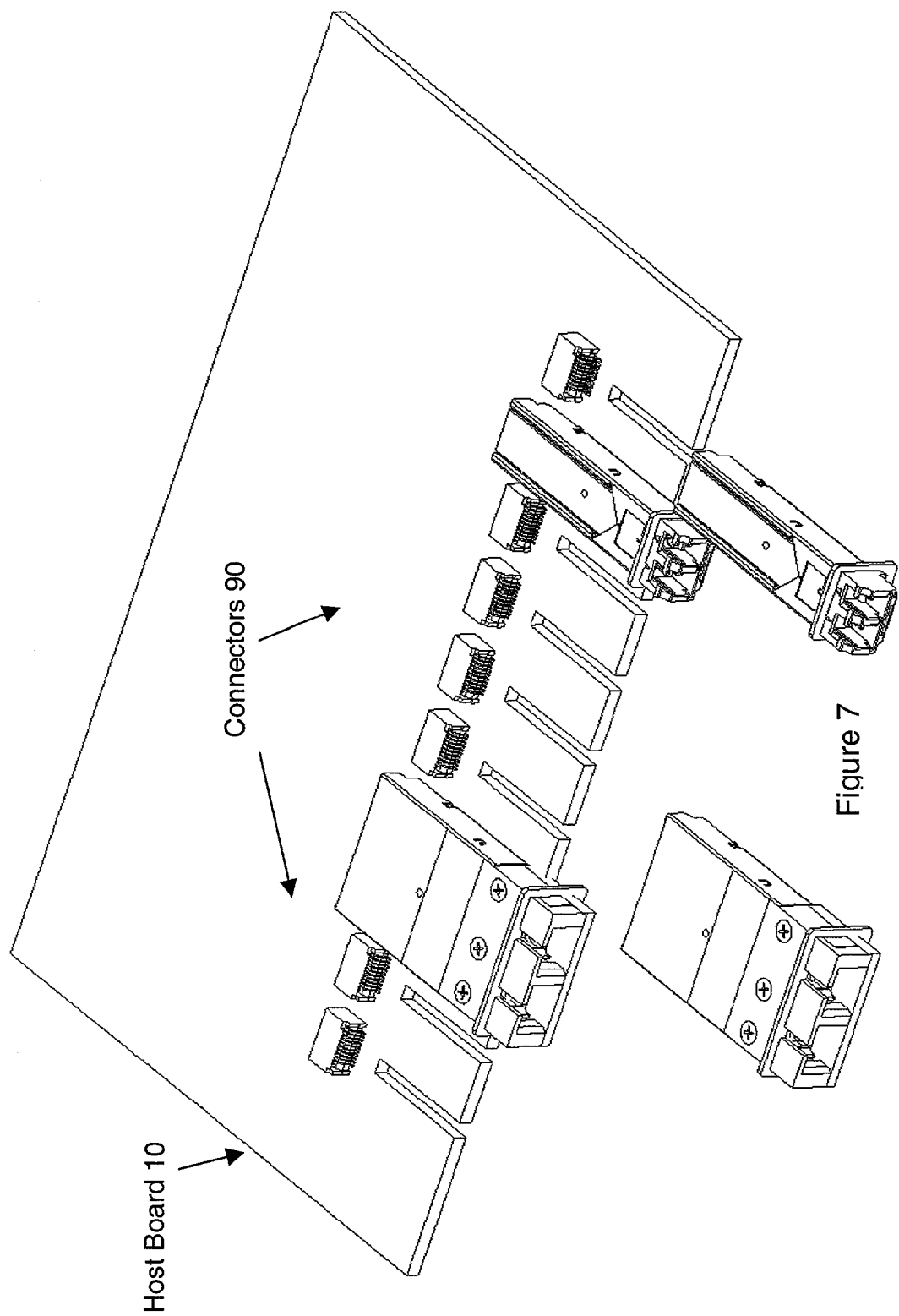
FIG. 7 is a diagram of a host board system, with emphasis on connectors included in the host board system, consistent with a preferred embodiment of the present invention.

Also distributed across the host board 10 is a series of connectors 90, which are preferably equal in number to the slots 80. FIG. 7 more clearly illustrates the connectors 90. Note that the connectors 90 are lined-up directly behind the slots 80 so that a single-width transceiver 70 can engage a connector 90 when inserted into any of the slots 80. FIG. 7 illustrates double-width transceivers 60 and single-width transceivers 70 before and after being electrically interfaced with a connector 90.

As indicated above, the transceivers electrically interface the connectors 90 when fully inserted into a slot 80. FIG. 8 illustrates functional plugs 150 and a non-functional plug 160. Each transceiver includes at least one functional plug 150, which passes signals between the transceiver and a connector 90 when engaged with the connector 90. Accordingly, single-width transceivers 70 include only one plug, but double-width transceivers 60 typically include one functional plug 150 and one non-functional plug 160 as illustrated in FIG. 8. In a preferred embodiment, the non-functional plug 160 mechanically engages a connector, but does not electrically engage the connector 90. The non-functional plug 160 thereby caps a connector 90 that is not accessible by other transceivers or otherwise used. In alternate embodiments, double-width transceivers 60 and wider transceivers include more than one functional plug 150 in order to increase the bandwidth of these transceivers. In yet another alternate embodiment, double-width transceivers 60 and wider transceivers include one functional plug 150 and one or more stabilizing plugs that mechanically engage with a connector and furthermore couple to ground and/or power supply connections with the connector so as to provide additional circuit ground and power supply connections to the transceiver.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A host board system comprising:
    a host board at least partially positioned within a housing having a set of openings, the host board including a set of connectors;
    each opening in the set of openings being aligned with at least two connectors from the set of connectors;
    said each opening configured to accept two modules of a first form factor so that each module of the first form factor is electrically coupled to one of the at least two connectors;
    said each opening further configured to accept a single module of a second form factor so that the single module of the second form factor is electrically coupled to a first connector of the at least two connectors; and
    a set of inserts, each insert from said set of inserts configured to plug at least a portion of an opening from the set of openings;
    wherein each module of the first form factor and each module of the second form factor includes a flange, said flange extending around a perimeter of a respective module and abutting an insert from the set of inserts when said respective module is electrically coupled to a connector from said set of connectors.

2. A host board system comprising:
a host board at least partially positioned within a housing having a set of openings, the host board including a set of connectors;
each opening in the set of openings being aligned with at least two connectors from the set of connectors;
said each opening configured to accept two modules of a first form factor so that each module of the first form factor is electrically coupled to one of the at least two connectors; and
said each opening further configured to accept a single module of a second form factor so that the single module of the second form factor is electrically coupled to a first connector of the at least two connectors;
wherein the housing comprises in part a bezel, the set of openings being distributed across said bezel.

3. The host board system of claim 2, wherein the bezel is fastened to the host board.

4. A host board system comprising:
a host board at least partially positioned within a housing having a set of openings, the host board including a set of connectors;
each opening in the set of openings being aligned with at least two connectors from the set of connectors;
said each opening configured to accept two modules of a first form factor so that each module of the first form factor is electrically coupled to one of the at least two connectors;
said each opening further configured to accept a single module of a second form factor so that the single module of the second form factor is electrically coupled to a first connector of the at least two connectors;
a set of slots on the host board, each slot from the set of slots corresponding to a connector from the set of connectors and configured to maintain an electric coupling between a module and a connector from the set of connectors;
said each slot configured to accommodate a guide rail included on modules of the first form factor, said modules of the first form factor having a single guide rail; and
adjacent slots from the set of slots configured to accommodate a pair of guide rails included on modules of the second form factor, said modules of the second form factor having a single pair of guide rails.

5. The host board system of claim 4, wherein
said each slot includes a means for securing a guide rail included on a module within said each slot.

6. A host board system comprising
a host board at least partially positioned within a housing having a set of openings, the host board including a set of connectors;
each opening from the set of openings being aligned with a plurality of connectors from the set of connectors;
said each opening from the set of openings configured to simultaneously accommodate one or more of a plurality of modules, said plurality of modules including modules with a first form factor and modules with a second form factor;
the modules with the first form factor each electrically interfacing a respective connector of said plurality of connectors aligned with a respective opening from the set of openings;
the modules with the second form factor each electrically interfacing a respective first connector from said plurality of connectors aligned with the respective opening from the set of openings; and
a set of inserts, each insert from said set of inserts configured to plug at least a portion of an opening from the set of openings;
wherein each module with the first form factor and each module with the second form factor includes a flange, said flange extending around a perimeter of a respective module and abutting an insert from the set of inserts when said respective module is electrically coupled to a connector from said set of connectors.

7. A host board system comprising
a host board at least partially positioned within a housing having a set of openings, the host board including a set of connectors;
each opening from the set of openings being aligned with a plurality of connectors from the set of connectors;
said each opening from the set of openings configured to simultaneously accommodate one or more of a plurality of modules, said plurality of modules including modules with a first form factor and modules with a second form factor;
the modules with the first form factor each electrically interfacing a respective connector of said plurality of connectors aligned with a respective opening from the set of openings; and
the modules with the second form factor each electrically interfacing a respective first connector from said plurality of connectors aligned with the respective opening from the set of openings;
wherein the housing comprises in part a bezel, the set of openings being distributed across said bezel.

8. The host board system of claim 7, wherein the bezel is fastened to the host board.

9. A host board system comprising
a host board at least partially positioned within a housing having a set of openings, the host board including a set of connectors;
each opening from the set of openings being aligned with a plurality of connectors from the set of connectors;
said each opening from the set of openings configured to simultaneously accommodate one or more of a plurality of modules, said plurality of modules including modules with a first form factor and modules with a second form factor;
the modules with the first form factor each electrically interfacing a respective connector of said plurality of connectors aligned with a respective opening from the set of openings;
the modules with the second form factor each electrically interfacing a respective first connector from said plurality of connectors aligned with the respective opening from the set of openings;
a set of slots on the host board, each slot from the set of slots corresponding to a connector from the set of connectors and configured to maintain an electric coupling between a module and a connector from the set of connectors;
said each slot configured to accommodate a guide rail included on modules with the first form factor, said modules with the first form factor having a single guide rail; and
adjacent slots from the set of slots configured to accommodate a pair of guide rails included on modules with the second form factor, said modules with the second form factor having a single pair of guide rails.

10. The host board system of claim 9, wherein said each slot includes a means for securing a guide rail included on a module within said each slot.

11. A host board system comprising
a host board, said host board including a set of connectors mounted on said host board and a set of slots defined in the host board;
each slot from the set of slots open to an edge of the host board;
the set of connectors positioned with respect to the set of slots such that a module with a first form factor slidingly engages with a slot from the set of slots so as to electrically couple with a corresponding connector from the set of connectors; and
the set of connectors also positioned with respect to the set of slots such that a module with a second form factor simultaneously slides into adjacent slots so as to electrically couple with a first corresponding connector from the set of connectors.

12. The host board system of claim 11, wherein the module with the second form factor when slidingly engaged with adjacent slots mechanically couples with a second corresponding connector from the set of connectors.

13. The host board system of claim 11, wherein the set of connectors are evenly spaced apart so that each connector from the set of connectors can simultaneously accommodate modules with the first form factor.

14. The host board system of claim 11, wherein
the set of slots are evenly spaced apart so that each slot from the set of slots can simultaneously accommodate modules with the first form factor.

15. The host board system of claim 11, wherein
said each slot from the set of slots has a central axis along which a module travels while when slidingly engaged with a slot from the set of slots, said central axis superposes a central axis of a corresponding connector.

16. The host board system of claim 11, wherein
the module with the first form factor comprises a single width transceiver.

17. The host board system of claim 11, wherein
the module with the second form factor comprises a double width transceiver.

18. The host board system of claim 11, wherein
each module includes a guide rail, said each slot from the set of slots being sized to accommodate the guide rail such that said guide rail is the portion of a module slidingly engaged with and in contact with a respective slot.

19. The host board system of claim 18, wherein
said each slot includes a means for securing the guide rail included within said each slot.

20. The host board system of claim 11, further comprising
a rigid body of uniform thickness, a surface of said rigid body abutting the edge of the host board; and
the surface including an array of openings, each opening from the array of openings sized to accommodate one or more modules.

21. The host board system of claim 20, further comprising
an insert configured to cover an opening from the array of openings, said insert forming a seal with said rigid body when said insert is inserted into said opening from the array of openings.

22. The host board system of claim 20, further comprising
an insert configured to cover a portion of an opening from the array of openings, said insert forming a seal with said rigid body when said insert is inserted into said opening from the array of openings.

23. The host board system of claim 22, wherein
the insert is further configured to accommodate a single module with the first form factor, said insert and said module with the first form factor forming a seal when said module with the first form factor is electrically coupled with a corresponding connector from the set of connectors.

24. The host board system of claim 22, wherein
the insert is further configured to accommodate two modules with the first form factor, said insert and said modules with the first form factor forming two seals when said modules with the first form factor are electrically coupled with corresponding connectors from the set of connectors.

25. The host board system of claim 22, wherein
the insert is further configured to accommodate a single module with the second form factor, said insert and said module with the second form factor forming a seal when said module with the second form factor is electrically coupled with a corresponding connector from the set of connectors.

26. The host board system of claim 22, wherein
said rigid body is fastened to said host board.

27. A host board system comprising
a host board, said host board including a set of connectors mounted on said host board and a set of slots defined in the host board;
each slot from the set of slots located along an edge of the host board such that said each slot is open to said edge;
the set of connectors positioned with respect to the set of slots such that each slot can separately accommodate a module with a first form factor engaging a corresponding connector from said set of connectors and a module with a second form factor engaging one or more corresponding connectors from said set of connectors; and
the set of slots spaced such that each slot from the set of slots can simultaneously accommodate a module with the first form factor.

28. The host board system of claim 27, wherein
the module with the second form factor electrically couples with a first connector from said one or more corresponding connectors.

29. The host board system of claim 28, wherein
the module with the second form factor mechanically couples with a second connector from said one or more corresponding connectors.

30. The host board system of claim 27, wherein
the module with the first form factor electrically couples with the connector.

31. The host board system of claim 27, wherein
the module with the first form factor comprises a single width transceiver.

32. The host board system of claim 27, wherein
the module with the second form factor comprises a double width transceiver.

33. The host board system of claim 27, wherein
each module includes a guide rail, said each slot from the set of slots being sized to accommodate the guide rail such that said guide rail is the portion of a module slidingly engaged with and in contact with a respective slot.

34. The host board system of claim 33, wherein
said each slot includes a means for securing the guide rail included within said each slot.

35. The host board system of claim 27, further comprising
a rigid body of uniform thickness, a surface of said rigid body abutting the edge of the host board; and
the surface including an array of openings, each opening from the array of openings sized to accommodate one or more modules.

36. The host board system of claim 35, further comprising
an insert configured to cover an opening from the array of openings, said insert forming a seal with said rigid body when said insert is inserted into said opening from the array of openings.

37. The host board system of claim 35, further comprising
an insert configured to cover a portion of an opening from the array of openings, said insert forming a seal with said rigid body when said insert is inserted into said opening from the array of openings.

38. The host board system of claim 37, wherein
the insert is further configured to accommodate a single module with the first form factor, said insert and said module with the first form factor forming a seal when said module with the first form factor engage a corresponding connector from the set of connectors.

39. The host board system of claim 37, wherein
the insert is further configured to accommodate two modules with the first form factor, said insert and said modules with the first form factor forming two seals when said modules with the first form factor engage corresponding connectors from the set of connectors.

40. The host board system of claim 37, wherein
the insert is further configured to accommodate a single module with the second form factor, said insert and said module with the second form factor forming a seal when said module with the second form factor engage a corresponding connector from the set of connectors.

41. The host board system of claim 35, wherein
said rigid body is fastened to said host board.

42. The host board system of claim 27, wherein
the module with the second form factor occupies two slots from the set of slots while engaging one or more corresponding connectors from said set of connectors.

* * * * *